US008438379B2

(12) United States Patent
Hoff et al.

(10) Patent No.: US 8,438,379 B2
(45) Date of Patent: May 7, 2013

(54) METHOD FOR VERIFYING USER CHANGEABLE CONFIGURATION SETTINGS AND SELECTIVELY MODIFYING NON-SUPPORTED SETTING VALUES TO SUPPORTED SETTING VALUES IN USER SELECTED AND NON-SELECTED CONTENT UNITS (75) Inventors: Roland Hoff, Walldorf (DE); Robert Bäthe, Heidelberg (DE); Jan Krieg, Dielheim (DE); Viktor Folmer, Neuhof-Dorfborn (DE)

(73) Assignee: SAP AG, Walldorf (DE)

( * ) Notice: Subject to any disclaimer, the term of this patent is extended or adjusted under 35 U.S.C. 154(b) by 200 days.

(21) Appl. No.: 12/889,782

(22) Filed: Sep. 24, 2010

(65) Prior Publication Data
US 2012/0079264 A1 Mar. 29, 2012

(51) Int. Cl.
G06F 1/24 (2006.01)
G06F 9/00 (2006.01)
G06F 11/00 (2006.01)

(52) U.S. Cl.
USPC .............................. 713/100; 714/38; 714/36

(58) Field of Classification Search .................... 714/38, 714/46; 713/100
See application file for complete search history.

(56) References Cited

U.S. PATENT DOCUMENTS

| 6,795,790 | B1* | 9/2004 | Lang et al. ..................... 702/123 |
| 7,058,536 | B2* | 6/2006 | Gabriel ......................... 702/123 |
| 7,519,880 | B1* | 4/2009 | Johnson et al. ................ 714/724 |
| 2003/0126517 | A1* | 7/2003 | Givoni et al. ................... 714/46 |
| 2003/0204784 | A1* | 10/2003 | Jorapur ........................... 714/38 |
| 2005/0071489 | A1* | 3/2005 | Parupudi et al. .............. 709/230 |
| 2008/0147455 | A1* | 6/2008 | Brunswig et al. ................. 705/7 |
| 2008/0244563 | A1* | 10/2008 | Sonkin et al. ................. 717/175 |
| 2008/0263503 | A1* | 10/2008 | Polly et al. .................... 717/100 |
| 2008/0282082 | A1* | 11/2008 | Uchida .......................... 713/153 |
| 2009/0307763 | A1* | 12/2009 | Rawlins et al. ................... 726/5 |

* cited by examiner

*Primary Examiner* — Thomas Lee
*Assistant Examiner* — Robert Cassity
(74) *Attorney, Agent, or Firm* — Kenyon & Kenyon LLP (57) ABSTRACT A value of a configuration setting contained within a selected content unit of an application may be used as input for a configuration check algorithm to calculate a control parameter output. The algorithm may include logical operators, conditional statements, mathematical logic, and mathematical functions. The algorithm may be used to verify the correctness of the value. Different control parameter output values may be associated with different options in the automated configuration verification program. The options may include, but are not limited to, modifying an unsupported configuration setting value to a supported value, updating configuration setting values in non-selected content units, exiting the automated program and switching to a manual configuration setting change mode, and automatically updating a configuration setting value to a supported value without further intervention.

20 Claims, 5 Drawing Sheets

METHOD FOR VERIFYING USER CHANGEABLE CONFIGURATION SETTINGS AND SELECTIVELY MODIFYING NON-SUPPORTED SETTING VALUES TO SUPPORTED SETTING VALUES IN USER SELECTED AND NON-SELECTED CONTENT UNITS

BACKGROUND

Organizations rely on computing systems to manage business processes. Generally, the complexity of these computing systems increases with the number and sophistication of the processes being managed. Enterprise systems, such as enterprise resource planning (ERP) systems, customer relationship management (CRM) systems, and business suite systems that interface with other business systems, such as inventory management systems and accounting systems tend to be relatively complex systems with thousands of customizable settings that may be changed depending on particular business needs.

As new systems are integrated into an organization, or existing systems are upgraded, these configurable settings may have to be changed in not only any new systems being added, but also sometimes in existing systems of the organization in order to fully integrate the new functionality offered by the new system. Because of the large number of settings that may have to be configured, integration of these systems may be time consuming and resource intensive. To minimize the integration costs associated with configuring settings, automated programs have been developed to verify the configuration of settings in new and existing systems.

However, these automated programs only perform a basic check of configuration settings. Once the program detects a configuration setting that is unsupported or inconsistent, the automated program is terminated and the unsupported configuration settings must be manually reconciled. Furthermore, subsequent configuration settings that have not been processed due to the termination of the automated program must also be manually examined and reconciled. These limitations associated with automated configuration verification programs have limited their usefulness and practicality.

There is a need for automated configuration verification programs that can automatically correct inconsistent and unsupported configuration settings and continue processing subsequent configuration settings with minimal user intervention.

DETAILED DESCRIPTION

In embodiments of the invention, a value of a configuration setting contained within a selected content unit of an application may be used as input for a configuration check algorithm to calculate a control parameter output. The algorithm may include logical operators, conditional statements, mathematical logic, and mathematical functions. The algorithm may be used to verify the correctness of the value by, for example, comparing the value to an expected value or checking the value for consistency with other configuration settings and then generating the control parameter output based on the result. Different control parameter output values may be associated with different options in the automated configuration verification program. In some embodiments, the options may include one or more of: modifying an unsupported configuration setting value to a supported value, updating configuration setting values in non-selected content units, exiting the automated program and switching to a manual configuration setting change mode, and automatically updating a configuration setting value to a supported value without further intervention.

Figure 1:
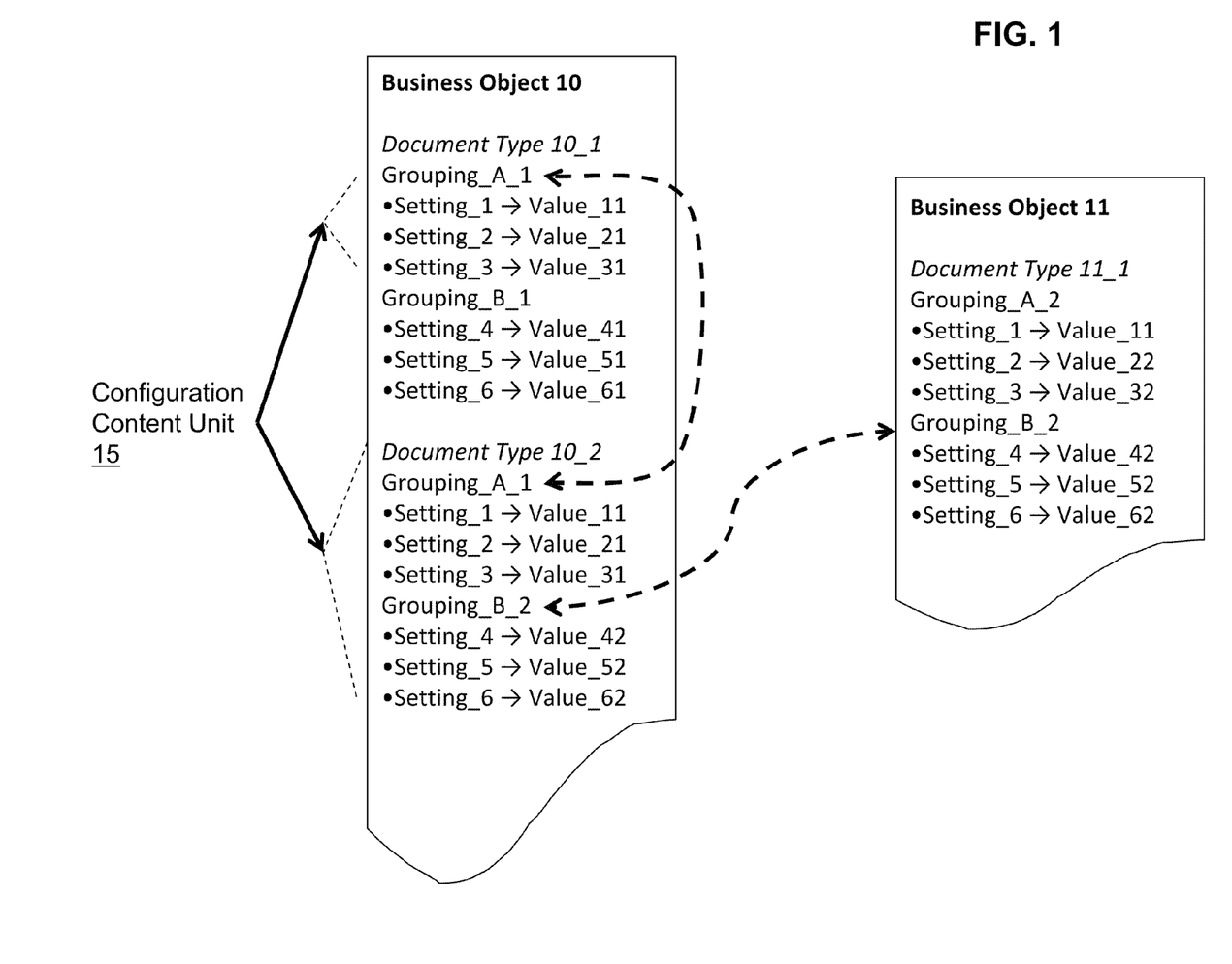
FIG. 1 shows an exemplary structure of configuration settings in an exemplary system.

FIG. 1 shows an exemplary structure of configuration settings in an exemplary system. Enterprise systems may contain applications interfacing with one or more business objects. A business object may include an object representing the entity in the business domain that the application is designed to support. For example, a sales program might have business objects to represent each sales order and invoice. An exemplary system may include many business objects. Two of these business objects 10 and 11 are shown in FIG. 1. Each business object may have different document types representing different variations of the business object, such as document types 10_1, 10_2 for business object 10, and document type 11_1 for business object 11. For example, if the business object is a sales order, then a first document type may represent a first variation of a sales order, such as for Internet-based orders, while the second document type may represent a second variation sales order, such as for telephone orders.

Each document type 10_1, 10_2, 11_1, may include several configurable settings, such as setting_1 to setting_6. Each of these settings may be assigned values, such as value_11 to value_61 and value_12 to value_62. Certain combinations of settings with similar values may be grouped together in a grouping, such as grouping_A_1 to grouping_B_2. Groupings may change when the values of the settings in the grouping change. For example, if the values of setting_2 and setting_3 in grouping_A_1 were to change from value_21 and value_31 to value_22, and value_32, respectively, then the grouping_A_1 would be reclassified as grouping_A_2, since the settings and values now corresponding to those associated with grouping_A_2 instead of grouping_A_1. If the value of setting_3 in either grouping_A_1 or grouping_A_2 were to change to a new value, such as value_33, that was not included in any preexisting grouping, then a new grouping, grouping_A_3, may be created if existing grouping_A_1 and grouping_A_2 are also still being used in other objects.

As shown in FIG. 1, different document types may include configuration settings from similar groupings. For example, the settings and values in grouping_A_1 may be included in both document type 10_1 and 10_2, while the settings and values in grouping_B_2 may be included in document types 10_2 and 11_1 in different business objects 10 and 11.

When performing configuration checks, the configurable settings that are examined during the checking process may be limited to a subset of settings in an application or system. A content configuration unit 15 may be used to select the subset of settings examined during the configuration check process. The subset of selected setting in the content configuration unit 15 may include any combination of settings within an application or system, such as groupings, document types, objects, or other divisible entities. Thus, content configuration unit 15 may specify different business objects, document types, groupings, and/or settings that are to be checked during the configuration check process.

If, for example, the settings in document type 10_2 in business object 10 are selected to be examined, and during the checking process a change is made to one of the settings, such as settting_4 in grouping B_2, other instances of the grouping B_2 outside of document type 10_2 in business object 10 may also be identified. Thus, for example, grouping B_2 may be identified as appearing in document type 11_1 of business object 11. If a change is made to the settings or values associated with the settings in the grouping, then the change may also be applied, in some instances, to one or more of the instances of the grouping outside the configuration content unit 15.

In other words, if document type 10_2 in business object 10 is selected to be examined during the configuration settings checking process, and a change is made to a setting, such as setting_4 in grouping B_2, then the change to setting_4 may optionally be applied to other instances of grouping B_2 outside of document type 10_2 in business object 10. Thus, setting_4 in grouping B_2 of document type 11_1 in business object 11 may also be changed. In some instances, a search may be conducted to identify these other instances, and a user may select one or more of the instances to which the settings change is to be applied.

Figure 2:
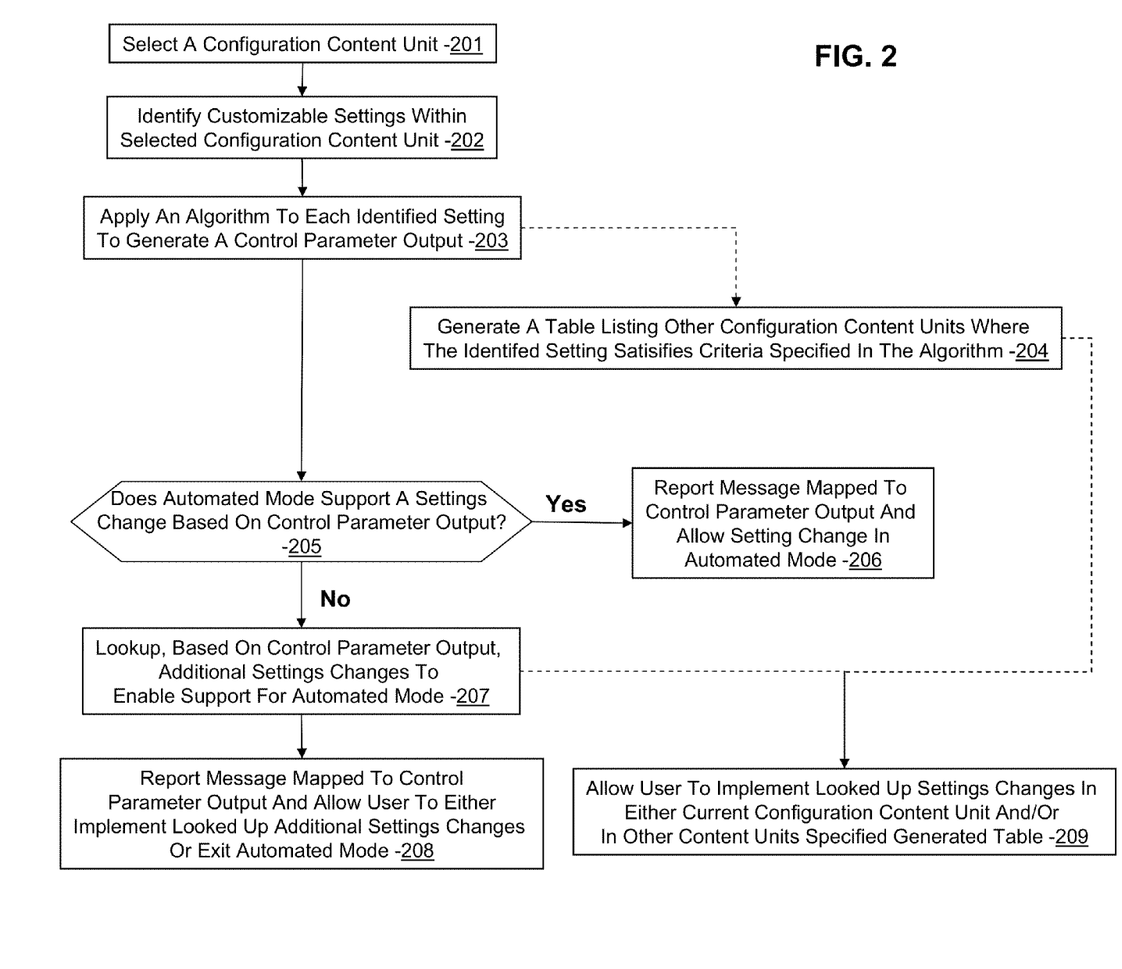
FIG. 2 shows an exemplary process for performing automated configuration checks with minimal user intervention.

FIG. 2 shows an exemplary process for performing automated configuration checks with minimal user intervention. In box 201, a configuration content unit may be selected. The configuration content unit may identify a portion of the system to be examined during the configuration check process. Thus, in the case of FIG. 1, the configuration content unit may identify one or more of a business object, document type, or grouping for examination, though other structures may be identified in other embodiments.

In box 202, the content configuration unit may be examined to identify configuration settings included within the content configuration unit.

In box 203, one or more values associated with the identified settings may be used as inputs to an algorithm. As discussed previously, the algorithm may include logical operators, conditional statements, mathematical logic, and mathematical functions. The algorithm may be used to verify the value by, for example, comparing the value to an expected value or checking the value for consistency with configuration settings and then generating the control parameter output based on the result.

In box 204, other non-selected portions of the system may be examined to identify instances where applying the criteria specified in the algorithm generates a similar control parameter output. Each of these instances may then be included in a table.

In box 205, the control parameter output may be examined and a determination may be made depending on the value of the control parameter output as to whether the automated mode supports the particular setting value. This determination may be made through a lookup table, or other method.

If the automated mode supports the particular setting value, then in box 206, a message mapped to the control parameter output may be retrieved and sent to a user interface screen to update the user, and the process may continue in the automated mode.

If the automated mode does not support the particular setting value, then in box 207, additional settings changes, if any, that correspond to the control parameter output may be looked up, in, for example, a lookup table, to identify a change necessary to enable support for the automated mode.

In box 208, a message mapped to the control parameter output may be retrieved and sent to a user interface screen to update the user, and the user may be provided with one or more options to implement the identified necessary change, or exit the automated mode and enter a manual mode where the user may manually enter setting changes. Alternatively, the user may not be provided with such an option, and the system may automatically implement the identified necessary change. A result of the implemented change may be provided to the user in some instances.

In box 209, the user may also be provided with the option to implement a setting change in one or more of the other instances listed in the table created in box 204.

Figure 3:
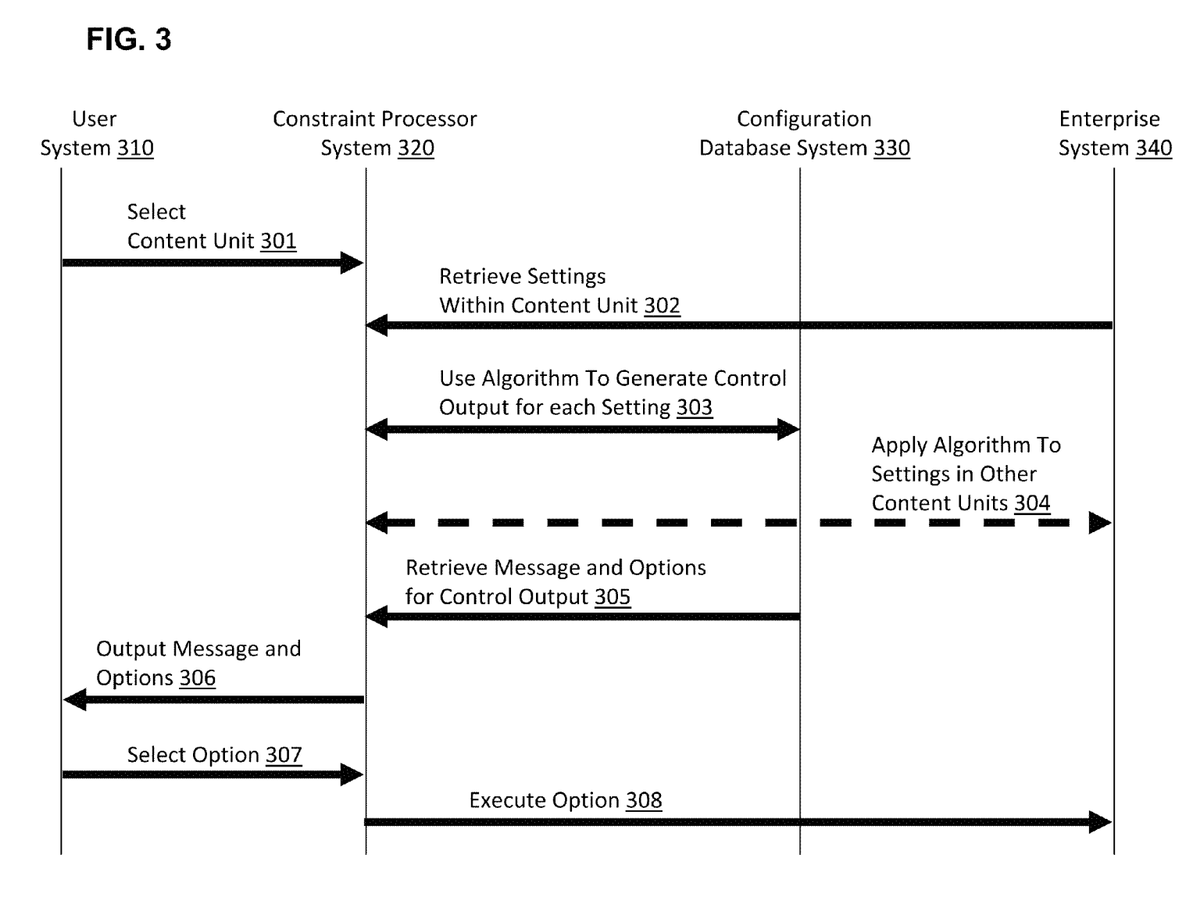
FIG. 3 shows an exemplary flow of data between systems in an embodiment of the invention.

FIG. 3 shows an exemplary flow of data between systems in an embodiment of the invention. Systems may include a user system 310, constraint processor system 320, configuration database system 330, and enterprise system 340. User system 310 may be used to manage and control the configuration setting verification process. During the configuration setting verification process, a user may select a configuration content unit that includes a set of configuration settings in an enterprise system 340 that are to be examined.

The selected configuration content unit 301 may be transmitted to the constraint processor system 320. The constraint processor system 320 may perform data processing functions associated with the configuration setting verification process. Once the configuration content unit has been identified, the constraint processor system 320 may retrieve the settings 302 from the enterprise system 340 that are contained within the selected content unit.

An algorithm 303 associated with each of the retrieved settings may be obtained from the configuration database system 330. The configuration database system 330 may store the algorithms, messages, and options used during the configuration setting verification process. The constraint processor system 320 may then apply a value associated with each retrieved settings as an input to a respective algorithm to calculate a control parameter output.

In some instances, the algorithm may also be applied 304 to similar settings in other instances of the enterprise system 340 that may not be included in the selected content unit to generated additional control parameter outputs.

Messages and options associated with each of the calculated control parameter outputs may then be obtained 305 from the configuration database system 330 and transmitted 306 to the user system 310.

A selected option 307 may be transmitted to the constraint processor system 320, and the constraint processor system may execute the selected option by interfacing with the enterprise system 340 to automatically update configuration setting values in the enterprise system 340 when the selected option involves automatically changing configuration setting values to a value supported by the automatic configuration check mode.

Figure 4:
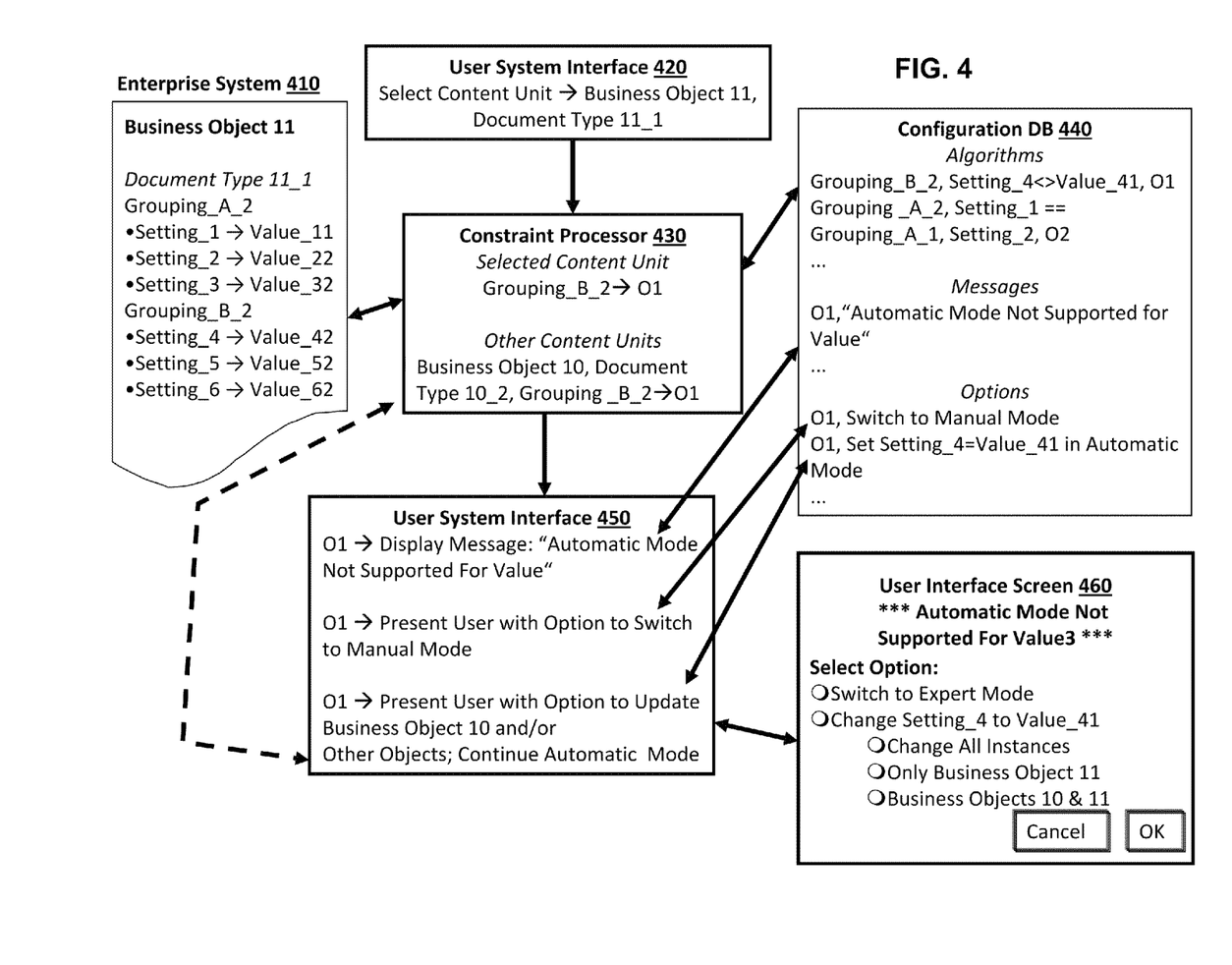
FIG. 4 shows an exemplary sequence of events in an embodiment of the invention.

FIG. 4 shows an exemplary sequence of events in an embodiment of the invention. First, at a user system interface 420, a user may select a specific configuration content unit associated with an enterprise system 410 having configurable settings that are to be checked during the configuration setting verification process. In this example, document type 11_1 in business object 11 is selected as the content unit, though other content units may be selected in other embodiments.

The constraint processor 430 may then access each of the settings in document type 11_1 of business object 11 in the enterprise system 410, in this example, setting_1 to setting_3 in grouping_A_2 and setting_4 to setting_6 in grouping_B_2. The constraint processor 430 may then use the existing values of these settings as included in components of the enterprise system 410, proposed values to be stored in the enterprise system 410, or some combination of the two.

The constraint processor 430 may then apply these values to one or more algorithms in the configuration database 440 to generate a control parameter output. For example, in the first algorithm, if value of setting_4 in grouping_B_2 is not equal to value_41, then the control parameter output may be set to value O1. Since, in this example, setting_4 in grouping_B_2 of business object 11 in enterprise system 410 is set to value_42 and not value_41, the control parameter output for this grouping_B_2 may be O1, as specified by the algorithm.

In some cases, a table may be generated listing other instances in which the algorithm generates a similar result. For example, in FIG. 1, business object 10 includes a document type 10_2 with grouping_B_2 that also has setting_4 set to value_42 instead of value_41. When the algorithm is applied to other instances outside the selected configuration content unit, this grouping_B_2 in business object 10 may also generate the same control parameter output O1. Accordingly, the grouping_B_2 in business object 10 may be added to the table.

Once all of the algorithms have been applied and the control parameter outputs have been generated, the messages and options associated with each control parameter output may be obtained from the configuration database 440. In this case the message associated with control parameter output O1 may be that the automated mode does not support the current value for setting_4. The messages may be used to make the user aware of the current status of configuration check process. In some instances, the process may be fully automated with minimal, if any, messages supplied to a user.

Options may be used to present a user which different choices for resolving configuration setting validation issues. In instances where full automation may be desired, the options may be rarely, if ever, used. Instead, the process may automatically implement settings changes that enable the validation process to continue in an automated fashion.

In this case, the options associated with control parameter output O1 may include switching to a manual mode to manually change configuration settings and automatically changing the setting_4 to value_41 in the selected content unit to continue in the automatic validation mode.

The options and messages associated with control parameter output O1 may then be sent to the user system interface 450 where they are restructured and then presented to the user on a user interface screen 460. The user may also be presented with an option to change the setting in other instances outside the selected configuration content unit, such as in those instances added to the table when applying the algorithm to similar settings in other content units.

In some instances the user may be presented with the option to change the setting value in one or more of these instances. For example, the user may be presented with the option to change the setting value only for settings with the selected configuration content unit, for similar settings in every instance throughout the enterprise system, or in selected instances outside the configuration content unit. However, in other instances, the user may not be presented with any options and the system may automatically self-select one of the options to expedite the configuration setting validation process with minimal user intervention.

Figure 5:
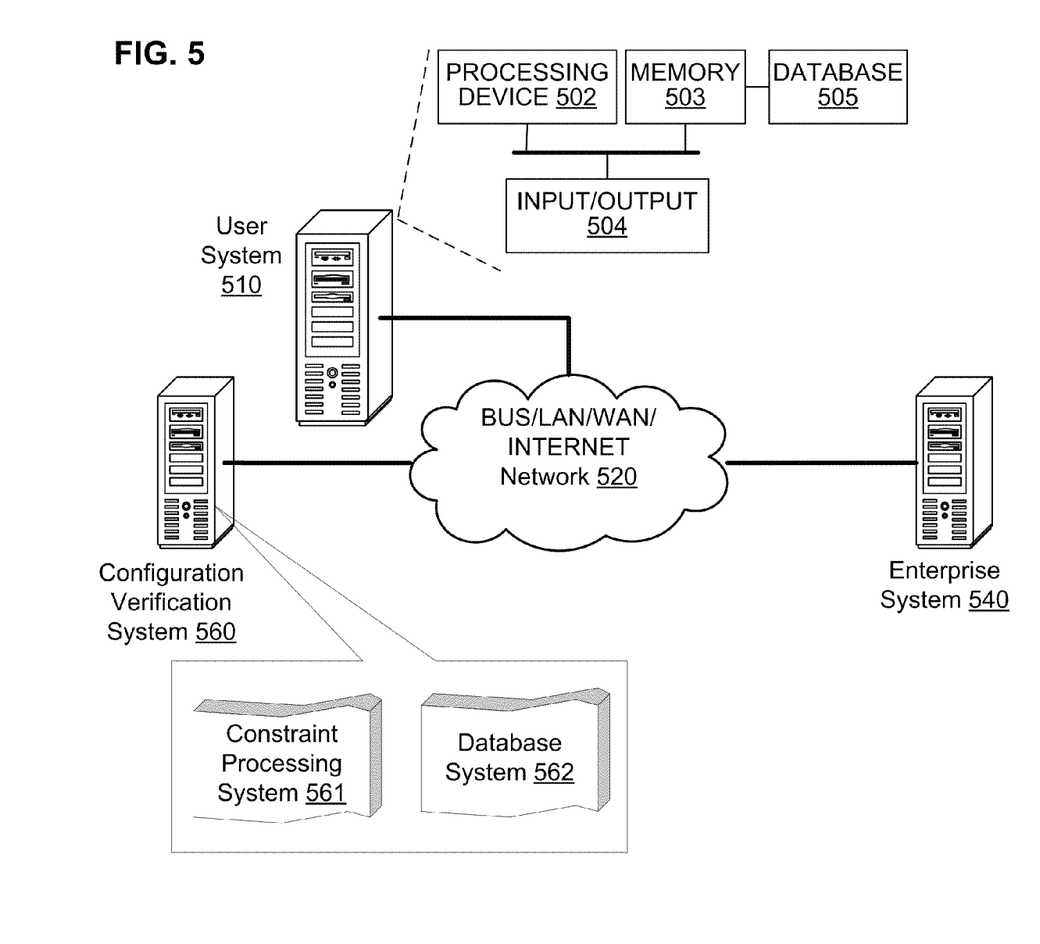
FIG. 5 shows an exemplary configuration of systems in an embodiment of the invention.

FIG. 5 shows an embodiment of a configuration validation system 560 coupled to a user system 510, and enterprise system 540 through a bus or network 520. In an embodiment, the configuration validation system 560 may include two or more system components, including constraint processing system 561 and configuration database system 562. Each of these components may be on separate, independent computing systems forming a configuration verification system 560, or the components 561, 562 may be consolidated or integrated into a single configuration validation system 560.

The enterprise system 540 may be connected to a firewall system (not shown), if needed, to prevent direct access to other systems of an organization including the user system 510, configuration validation system 560, and enterprise system 540.

Each of the systems in FIG. 5 may contain a processing device 502, memory 503 containing a database 505, and an input/output interface 504, all of which may be interconnected via a system bus. In various embodiments, each of the systems 510, 540, 560, 561, and 562 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

In an embodiment, memory 503 may contain different components for retrieving, presenting, changing, and saving data. Memory 503 may include a variety of memory devices, for example, Dynamic Random Access Memory (DRAM), Static RAM (SRAM), flash memory, cache memory, and other memory devices. Additionally, for example, memory 503 and processing device(s) 502 may be distributed across several different computers that collectively comprise a system.

Processing device 502 may perform computation and control functions of a system and comprises a suitable central processing unit (CPU). Processing device 502 may comprise a single integrated circuit, such as a microprocessing device, or may comprise any suitable number of integrated circuit devices and/or circuit boards working in cooperation to accomplish the functions of a processing device. Processing device 502 may execute computer programs, such as object-oriented computer programs, within memory 503.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but some systems and methods consistent with the present invention may be implemented in software or hardware alone. Additionally, although aspects of the present invention are described as being stored in memory, this may include other computer readable media, such as secondary storage devices, for example, hard disks, floppy disks, or CD ROM; the Internet or other propagation medium; or other forms of RAM or ROM.

We claim:

1. A computer-implemented method for performing a configuration check to verify a validity of user changeable configuration settings in an application comprising:
responsive to receiving an identifier of a selected content unit in the application containing a plurality of user changeable configuration settings of the application, retrieving a configuration check algorithm to verify the validity of a configuration setting of the selected content unit, the selected content unit representing a subset of functionality of the application;

applying, through a processing device, a value of the configuration setting in the selected content unit retrieved from the application to the configuration check algorithm to calculate a control parameter output;

identifying at least one instance in at least one non-selected content unit of the application where the retrieved configuration check algorithm generates a same calculated control parameter output;

including each identified instance in each non-selected content unit in a table;

responsive to the calculated control parameter output having a first unsupported value in a first automated configuration check interface, sending an option to exit the first automated configuration check interface and enter a second manual configuration check interface to a user interface system, the second manual configuration check interface providing options in an interface for a user to manually change the configuration setting value (i) in the selected content unit and (ii) in the selected content unit and those non-selected content units in the table;

responsive to the calculated control parameter output having a second unsupported value in the first automated configuration check interface, sending options to modify the configuration setting value to a predetermined supported value fp in the selected content unit and (ii) in those non-selected content units in the table and after an option selection is made, continue checking another configuration setting value in the first configuration check interface to the user interface system; and responsive to the calculated control parameter output having a supported value in a first configuration check interface, continue checking another configuration setting value in the first configuration check interface to the user interface system.

2. The method of claim 1, wherein the first configuration check interface is an automated interface that automatically modifies a configuration setting value, the second configuration check interface is a manual interface to enable a manual user modification of the configuration setting value, and the second configuration check interface exits and the first configuration check interface resumes once the manual user modification of the configuration setting value is complete.

3. The method of claim 1, wherein the application includes a plurality of business objects, a plurality of document types associated with the plurality of business objects, and a plurality of groupings associated with the plurality of document types, each grouping having designated configuration settings with designated values.

4. The method of claim 3, wherein the selected content unit includes a designated grouping within a designated document type of a designated business object.

5. The method of claim 4, further comprising:
identifying configuration settings in non-selected content units having a same applied value of the same configuration setting in the selected content unit;
responsive to the calculated control parameter output having the second unsupported value, sending, to the user interface system, an option to modify at least one of the identified configuration settings in non-selected content units to the supported value; and
changing the configuration settings of any identified configuration settings opted for modification to the supported value.

6. The method of claim 1, wherein the first unsupported value is different from the second unsupported value.

7. The method of claim 1, wherein the first unsupported value is a same value as the second unsupported value.

8. The method of claim 1, wherein the predetermined supported value is a predetermined value of the configuration setting that when applied to the configuration check algorithm, generates a supported control parameter output.

9. The method of claim 1, further comprising:
identifying instances of the configuration setting in non-selected content units of the application;
applying, through the processing device, a value of the configuration setting in each instance to the configuration check algorithm to calculate a control parameter output for each instance;
identifying those instances having unsupported control parameter output values in the first configuration check interface that would be supported if modified to supported values; and
sending an option to modify configuration values in one or more of the unsupported instances to supported values.

10. A computer-implemented method for performing automated configuration checks to verify a validity of user changeable configuration settings in an application of an enterprise system comprising:
iteratively applying, through a processing device, values of selected configuration settings in the enterprise system to respective configuration check algorithms in a selected content unit of an application representing a subset of functionality of the application to verify the validity of the user changeable configuration settings;
calculating a control parameter outputs from applying each of the configuration setting values to the respective configuration check algorithms;
identifying at least one instance in at least one non-selected content unit of the application where the respective configuration check algorithm generates a same calculated control parameter output;
including each identified instance in each non-selected content unit in a table;
responsive to an application indicating that the respective value is supported, proceeding to a next iteration; and
responsive to the application indicating that the respective value is not supported, providing options to modify the respective value to a supported value (i) in the selected content unit and (ii) in those non-selected content units in the table, and after an option selection is made, substituting the unsupported value with the supported value according to the option selection, the supported value identified from a data source linked to the respective algorithm, and proceeding to the next iteration.

11. The method of claim 10, wherein the selected configuration settings are specified in a configuration content unit.

12. The method of claim 11, wherein the enterprise system includes a plurality of business objects, a plurality of document types associated with the plurality of business objects, and a plurality of groupings associated with the plurality of document types, each grouping having designated configuration settings with designated values and the configuration content unit identifies at least one of the groupings in at least one of the document type associated with at least one of the business objects.

13. The method of claim 12, wherein the selected configuration settings include only those within the identified at least one grouping in the content configuration unit.

14. The method of claim 10, further comprising, responsive to the application indicating that the respective value is not supported, identifying similar instances of non-selected configuration settings with the unsupported value and changing at least one of these unsupported values to the supported value.

15. The method of claim 14, wherein each identified similar instance is included in a table that is sent to an interface system for subsequent selection of instances to be changed from the unsupported value to the supported value.

16. A system to verify a validity of user changeable configuration settings of an application comprising:
   a configuration database storing a configuration check algorithm to verify a validity of a configuration setting of a selected content unit representing a subset of functionality of the application, and a plurality of options;
   a connection to a user interface and the application; and
   a processing device to apply a value of a configuration setting retrieved from the application through the connection to a corresponding configuration check algorithm retrieved from the configuration database in a selected content unit of the application, calculate a control parameter output from the application, identify at least one instance in at least one non-selected content unit of the application where the retrieved configuration check algorithm generates a same calculated control parameter output, include each identified instance in each non-selected content unit in a table; and send an option from configuration database to the user interface through the connection corresponding to the control parameter output, the options including:
   responsive to the calculated control parameter output having a first unsupported value in a first automated configuration check interface, a first option to exit the first automated configuration check interface and enter a second manual configuration check interface, the second manual configuration check interface providing options in an interface for a user to manually change the configuration setting value (i) in the selected content unit and (ii) in the selected content unit and those non-selected content units in the table;
   responsive to the calculated control parameter output having a second unsupported value in the first automated configuration check interface modifiable to a supported value, second options to modify the unsupported value to the supported value (i) in the selected content unit and (ii) in those non-selected content units in the table, and after an option selection is made, continue checking another configuration setting value in the first configuration check interface; and
   responsive to the calculated control parameter output having a supported value in a first configuration check interface, a third option to continue checking another configuration setting value in the first configuration check interface.

17. The system of claim 16, wherein the first configuration check interface is an automated interface that automatically modifies a configuration setting value, the second configuration check interface is a manual interface to enable a manual user modification of the configuration setting value, and the second configuration check interface exits and the first configuration check interface resumes once the manual user modification of the configuration setting value is complete.

18. The system of claim 16, wherein the application includes a plurality of business objects, a plurality of document types associated with the plurality of business objects, and a plurality of groupings associated with the plurality of document types, each grouping having designated configuration settings with designated values.

19. The system of claim 18, wherein the selected content unit includes a designated grouping within a designated document type of a designated business object.

20. The system of claim 19, wherein the processing device:
   identifies configuration settings in non-selected content units having a same applied value of the same configuration setting in the selected content unit;
   responsive to the calculated control parameter output having the second unsupported value, sends, to the user interface system, an option to modify at least one of the identified configuration settings in non-selected content units to the supported value; and
   changes the configuration settings of any identified configuration settings opted for modification to the supported value.

* * * * *